(12) United States Patent
Kim

(10) Patent No.: US 7,001,451 B2
(45) Date of Patent: Feb. 21, 2006

(54) FILTER STRUCTURE FOR A VEHICLE AIR CONDITIONER

(75) Inventor: Dong Il Kim, Anyang (KR)

(73) Assignee: Kia Motors Corporation, Seoul (KR)

( * ) Notice: Subject to any disclaimer, the term of this patent is extended or adjusted under 35 U.S.C. 154(b) by 148 days.

(21) Appl. No.: 10/613,874

(22) Filed: Jul. 2, 2003

(65) Prior Publication Data

US 2004/0083895 A1    May 6, 2004

(30) Foreign Application Priority Data

Nov. 2, 2002 (KR) .................. 10-2002-0067639

(51) Int. Cl.
*B01D 35/143* (2006.01)
(52) U.S. Cl. .................. 96/415; 96/417; 96/418; 55/385.3; 55/DIG. 34; 356/438
(58) Field of Classification Search ............... 55/385.3, 55/DIG. 34; 96/414, 415, 417, 418, 421, 96/423; 250/341.1, 573; 356/432, 436, 356/437, 438; 340/607
See application file for complete search history.

(56) References Cited

U.S. PATENT DOCUMENTS 5,796,472 A  *  8/1998  Wirthlin ................ 356/72

* cited by examiner

*Primary Examiner*—Robert A. Hopkins
(74) *Attorney, Agent, or Firm*—Morgan Lewis & Bockius LLP

(57) ABSTRACT

A filter structure of a vehicle air conditioner comprises a filter cartridge provided with a plurality of filter papers within a case and a light source. The light source is provided at a position within the filter papers for radiating light toward one side of the case. The light is blocked when pollutants deposited on the filter papers are enough to cause a contaminated state of the filer to reach a preset state. A display section is provided on the case for transmitting the light, radiated from the light source, to be visually checked on the external side. Therefore, the filter structure allows a driver to check a proper exchange time of the filter visually through a display section in which a display state changes according to a contaminated state of the filter.

17 Claims, 2 Drawing Sheets

FILTER STRUCTURE FOR A VEHICLE AIR CONDITIONER

FIELD OF THE INVENTION

Generally, the present invention relates to a filter structure for an air conditioner of a vehicle. More particularly, the filter structure is provided with a display section for viewing the filter, thereby, enabling a driver to visually monitor contamination of the filter and change the filter in proper time.

BACKGROUND OF THE INVENTION

Typically, vehicles are fitted with an air conditioner. The air conditioner is designed to force outdoor air into the vehicle. In doing so the indoor air of the vehicle is circulated by a fan and subjected to heat exchange, thereby cooling the air.

The outdoor air contains many various fine solid pollutants, such as dusts, particulates, and pollen grains. Furthermore, with the increase in the number of vehicles the environment, in particular the air, has become polluted with various pollutants, such as particulates and harmful gases. Also, various gaseous pollutants existing in the outdoor air include a malodor.

By preventing the pollutants from entering the inside of the vehicle, the concentration of pollutants can be reduced. In doing so, an air conditioner is generally provided with a filter, thereby maintaining a comfortable indoor environment. In the conventional air conditioner, such a filter is typically mounted between a blower unit and an air discharge passage. The typical filter is configured in a cartridge fashion. In this configuration the filter can be easily exchanged following removal of a lid of a glove box on the front passenger's seat side of the vehicle.

However, a drawback is that the filter is inevitably concealed beyond the glove box due to the typical vehicle layout. Therefore, the driver often has little idea of the position where the filter is mounted, and even if the driver knows, he/she has difficulty in checking whether or not the filter is contaminated.

In order to overcome this disadvantage, several approaches have been proposed in the art. For instance, some approaches have been designed to provide the filter with an optical sensor. In one such approach, when the filter becomes contaminated with pollutants, an optical sensor causes a light receiving part to cut off a signal and thus, a warning lamp is flashed. In another approach, when the filter becomes accumulated with pollutants, an air pressure difference is generated across the filter which causes a light source to be displayed indicating the filter needs checking.

Some different approaches have been designed to provide the filter with an airflow sensor. According to one design, when the filter becomes contaminated with pollutants, an air flow sensor detects this condition and a warning lamp is flashed. Another design is constructed so that when the filter is contaminated with pollutants, an intake air pressure difference is generated across the filter, and thus a conductive thin film is fluctuated to enable a warning lamp to be flashed.

However, these conventional approaches have drawbacks in that each has a relatively complicated construction. Therefore, production costs are increased due to a circuit structure having various types of sensors, warning lamps and so forth. Furthermore, assembly time is increased.

SUMMARY OF THE INVENTION

The present invention provides a filter structure for a vehicle air conditioner comprising a display section. The display state of the filter changes according to the contaminated state of the filter used therein, thereby, the display section allows a driver to visually check a proper exchange time of the filter.

Embodiment of the present invention provide a filter cartridge with a plurality of filter papers that are formed into a plurality of layers within a case. A light source is provided at a position within the filter papers for radiating light toward one side of the case. The light is blocked when pollutants, deposited on the filter papers, become so concentrated as to cause a contaminated state of the filer to reach a preset state. A display section is provide on the case for transmitting the light radiated from the light source to allow visual checking on an external side.

It is preferred that the display section comprises a base part made of a transmittable material and a checking part formed with a color which is similar to that of the base part when light is transmitted. However, when the light becomes blocked by the contaminates on the filter, the color is contrasted with that of the base part.

Preferably, the case of the filter cartridge is provided on one side with a first electrical contact connected with the light source. A filter body, into which the filter cartridge is detachably inserted, is provided with a second electrical contact connected with a power source. When the filter cartridge is inserted into the filter body the first contact comes into contact with the second contact to form a circuit connecting the light source to the power source.

More preferably, the filter structure further comprises a switch for opening/closing the circuit between the power source and the second contact.

It is also preferred that the display section is positioned on the inside beyond a glove box. The switch is turned on/off by a pivot on a lower end of a lid of the glove box. When the lid of the glove box is opened the switch causes the circuit to be closed such that power is supplied to the light source. According to another embodiment, a vehicle air conditioner filter structure comprises a filter cartridge housing a plurality of filter paper layers. Also included is a light emitting member configured to transmit light through the filter paper layers toward an edge of the filter cartridge. A display section is coupled with the filter cartridge and positioned to align with the transmitting light such that a user can determine a contaminated state of the filter paper.

BRIEF DESCRIPTION OF THE DRAWINGS

The above and other objects, features, and advantages of the present invention will be more clearly understood from the following detailed description read in conjunction with the accompanying drawings, in which:

FIGS. 4A and 4B illustrate an operation of a display section of a filter of a vehicle air conditioner according to an embodiment of the present invention, in which FIG. 4A shows when the filter operates normally, while FIG. 4B shows when the filter needs to be exchanged.

DETAILED DESCRIPTION OF THE INVENTION

Figure 1:
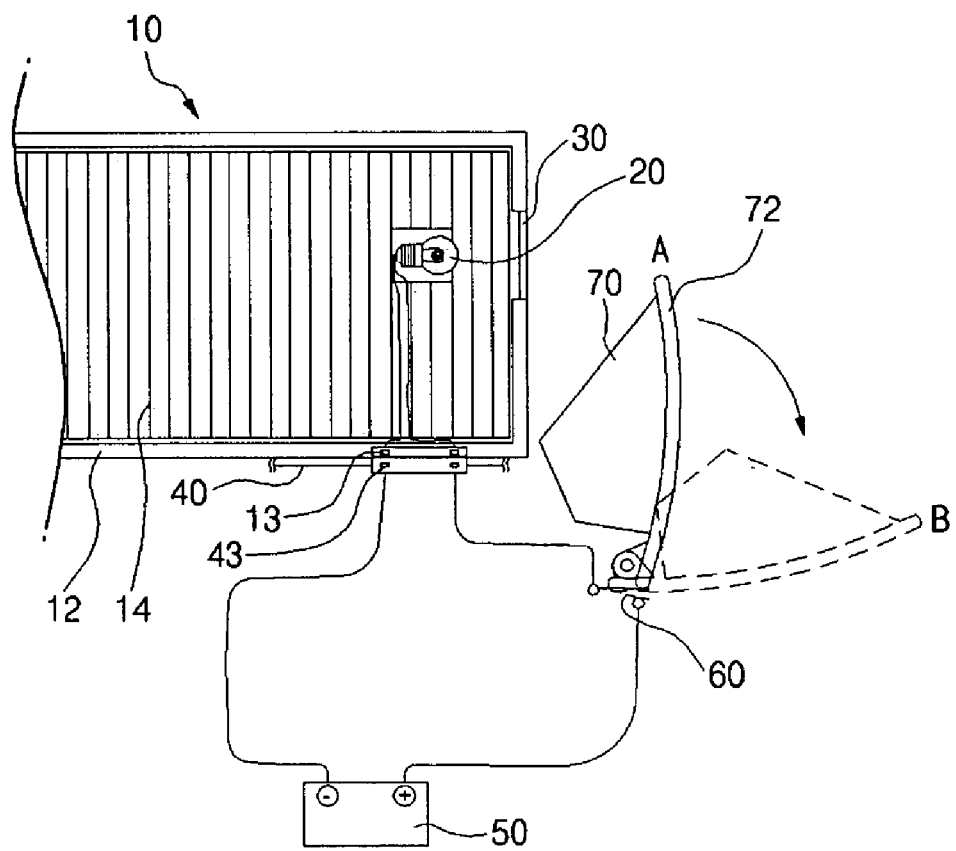
FIG. 1 shows a filter structure of a vehicle air conditioner according to an embodiment of the present invention.
Figure 2:
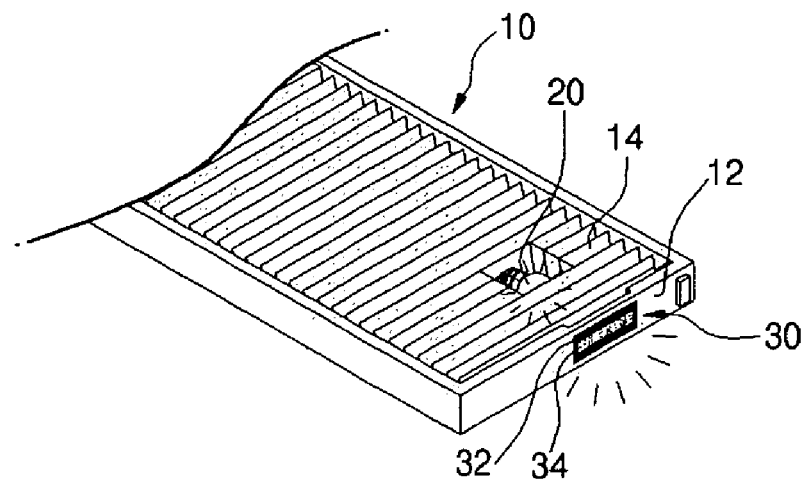
FIG. 2 shows a display section of a filter of a vehicle air conditioner according to an embodiment of the present invention.

As shown in FIGS. 1 and 2, in one embodiment of the invention, the filter is mounted as a cartridge for the sake of convenient assembly and exchange. The air conditioner filter is mounted at an exchangeable position behind a lid 72 of a glove box on the front passenger side of a vehicle. A filter cartridge 10 is constructed so that a plurality of filter papers 14 are formed as a plurality of layers within a roughly rectangular case 12. A light source 20 is provided between the filter papers 14 in order to radiate light toward a display section 30, described below. In particular, the light source 20 is provided at such a position that light radiated toward the display section 30 is capable of being blocked when the filter reaches a contaminated state or "preset state" by pollutants distributed on the filter paper 14.

Here, the term "preset state" refers to one in that pollutants are deposited on the filter papers 14 to the extent to determine that the filter cartridge 10 needs to be exchanged. However, such a preset state may vary according to a specific specification of the filter papers 14, such as paper material or the like.

After this preset state is roughly determined, it is determined at which position the light source 20 is installed. When pollutants are not deposited on the filter paper 14, a constant intensity of light arrives at the display section 30. However, when the filter papers 14 are contaminated up to the preset state, deposited pollutants cause light to be blocked, so that light does not reach the display section 30. Therefore, the position of the light source 20 is determined in view of such a relationship.

The light source 20 can be a miniature electric bulb, a light-emitting diode (LED), or the like.

Figure 3:
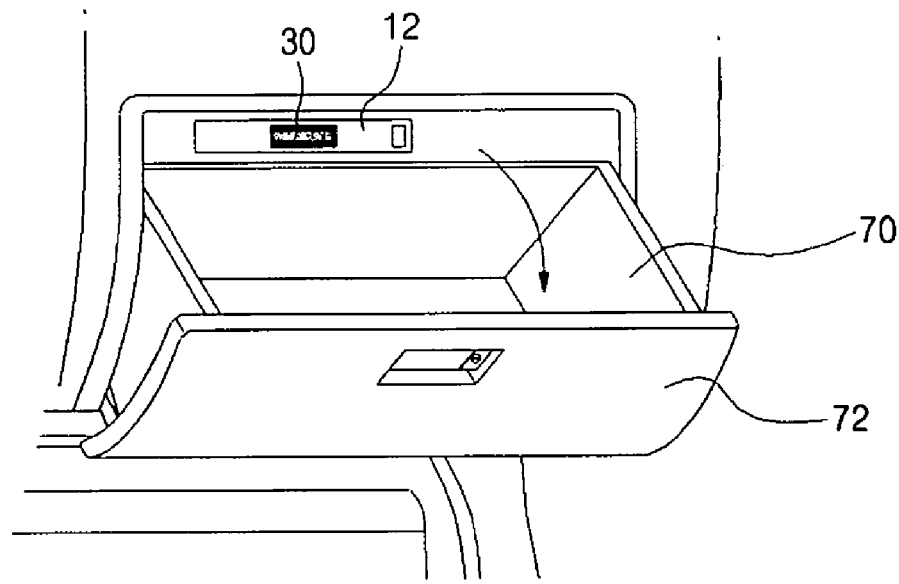
FIG. 3 shows a mounted state of a filter of a vehicle air conditioner according to an embodiment of the present invention.
Figure 4A:
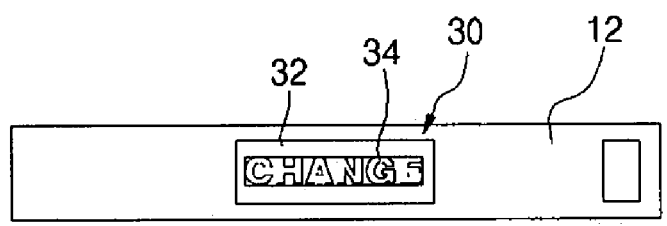
Figure 4B:
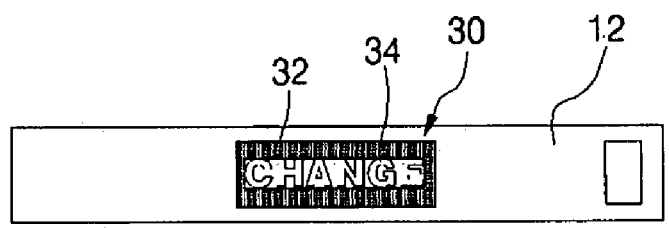

FIGS. 3, 4A and 4B show the display section 30 installed on the case 12 of the filter cartridge 10. The display section 30 is formed to transmit light, radiated from the light source 20, and visually seen from the outside.

The display section 30 includes a base part 32 made of a transmittable material and a checking part 34 formed with a color (e.g., white), which is similar to that of the base part 32 (e.g., daylight blue) when light is transmitted, but is contrasted with that of the base part 32 (dark color) when light is not transmitted.

In other words, when the filter has a low contamination level, the base part 32 is not easily distinguished from the checking part 34. By contrast, when the filter has a high contamination level, light radiated toward the base part 32 is almost blocked. Therefore, the checking part 34 is easily recognized against the base 32. On the basis of this principle, the contamination level of the filter is indicated to the driver. In this case, the checking part 34 is preferably constructed as a word, such as "EXCHANGE".

The case 12, of the filter cartridge 10, is provided on one side with a first contact 13 that connects with the light source 20. A body 40 of the filter, into which the filter cartridge 10 is detachably inserted, is provided with a second contact 43 that connects with a power source 50. When the filter cartridge 10 is inserted into the filter body 40, the first contact 13 comes into contact with the second contact 43. A circuit is therefore constructed connecting the light source 20 to the power source 50. This construction allows for eliminating the necessity to exchange a wire harness every time the filter is exchanged.

A switch 60 (FIG. 1) is provided between the power source 50 and the second contact 43 in order to open/close the circuit. The switch 60 is turned on/off in a contactable manner by a pivot on the lower end of the lid 72 (FIGS. 1 and 3) of the glove box. Therefore, the switch 60 allows the circuit to be closed when the lid 72 of the glove box is opened, so that power is supplied to the light source 20. Therefore, when the lid 72 of the glove box is opened, light is illuminated toward the display section 30.

Hereinafter, description will be made regarding an operation of the air conditioner filter according to an embodiment of the present invention.

According to FIG. 1, when the lid 72 of the glove box is opened from position A to position B switch 60 is contacted, i.e., turned on by the lower end of lid 72 of the glove box. As a result, the circuit is closed, power is supplied to the light source 20 within the filter cartridge 20, and the driver is able to see the light transmitted to the display section 30.

Light radiated from the light source 20 passes through the layers of the filter papers 14 to reach the display section 30. When the amount of pollutant material deposited on the filter papers 14 is low, a considerable amount of light radiated from the light source 20 reaches the display section 30. However, when the amount of pollutant material deposited on the filter papers 14 is high, most of light radiated from the light source 20 is blocked by the layers of the filter papers 14. FIG. 4A shows the display section when the amount of pollutant material is low. FIG. 4B shows the display section when the amount of pollutant material is high.

As shown, when the amount of pollutant material is low, a considerable amount of light radiated from the light source is transmitted through the base part 32 of the display section 30, thus the base part 32 is easily distinguished from the checking part 34. However, when the amount of pollutant material is high, the radiated light hardly reaches the display section 30. Therefore, the base part 32 shows up as a dark color and the checking part 34 is colored with a light color. Thereby, the driver is able to easily see the fact that the exchange time of the filter has arrived.

As will be seen from the foregoing, the filter structure of the vehicle air conditioner of the present invention allows a driver to check a proper exchange time of the filter visually through a display section in which a display state changes according to a contamination state of the filter. Consequently, reduction of air flow and generation of malodor caused by pollutants can be prevented through the proper exchange of the filter.

While the present invention mentioned above has been shown and described in connection with the preferred embodiment, it is intended that the present invention is not limited to the foregoing embodiment but those skilled in the art can make various modifications and variations without departing from the principle of the invention as defined in the appended claims.

What is claimed is:

1. A filter structure of a vehicle air conditioner comprising:
   a filter cartridge provided with a plurality of filter papers that are formed into a plurality of layers within a case;
   a light source, provided at a position within the filter papers, for radiating light toward one side of the case, the light being blocked at the position when pollutants are deposited on the filter papers enough to cause a contaminated state of the filter to reach a preset state; and a display section, provided on the case, for transmitting the light radiated from the light source to be checked on an external side with a naked eye, so that the naked eye sees a color in the display section due to an amount of transmitted light.

2. A filter structure in accordance with claim 1, wherein the display section comprises a base part made of a transmittable material and a checking part formed with a color which is similar to that of the base part when light is transmitted, but which is contrasted with that of the base part when light is not transmitted.

3. A filter structure in accordance with claim 1, wherein the case of the filter cartridge is provided on one side with a first contact connected with the light source, and a filter body into which the filter cartridge is detachably inserted is provided with a second contact connected with a power source, so that when the filter cartridge is inserted into the filter body, the first contact comes into contact with the second contact to form a circuit connecting the light source to the power source.

4. A filter structure in accordance with claim 3, further comprising a switch for opening/closing the circuit between the power source and the second contact.

5. A filter structure in accordance with claim 4, wherein the switch is turned on/off in a contactable manner by a pivot on a lower end of a lid of a glove box, so that when the lid of the glove box is opened, the switch causes the circuit to be closed to supply power to the light source and wherein the display section is positioned on the inside beyond the glove box.

6. A vehicle air conditioning filter structure, comprising:
a filter cartridge housing a plurality of filter paper layers;
a light emitting member configured to transmit light through said filter paper layers toward an edge of said filter cartridge; and
a display section coupled with said filter cartridge and positioned to align with transmitting light such that a user can determine a contaminated state of the filter paper by visually detecting a color change in the display section due to a change in an amount of transmitting light.

7. The structure of claim 6, wherein said display section comprises multiple colored sections such that light emitting from the filter cartridge causes the colors to substantially match and when light is blocked from being emitted by a contaminated filter, the colors substantially do not match.

8. The structure of claim 6, wherein the light emitting member is a light source housed within said plurality of filter paper layers of said filter cartridge.

9. The structure of claim 8, wherein the light source is a light bulb or a LED.

10. The structure of claim 6, further comprising a filter body configured and dimensioned to receive said filter cartridge.

11. The structure of claim 10, wherein the filter cartridge further comprises a first electrical contact and the filter body further comprises a second electrical contact, said first electrical contact and said second electrical contact being configured and dimensioned to complete a circuit when said filter cartridge is received by said filter body.

12. The structure of claim 6, further comprising a switch configured and dimensioned to activate said light emitting member.

13. The structure of claim 12, wherein said switch is activated by opening and closing a glove box door of the vehicle.

14. A filter structure of a vehicle air conditioner comprising:
a filter cartridge provided with a plurality of filter papers that are formed into a plurality of layers within a case;
a light source, provided at a position within the filter papers, for radiating light toward one side of the case, the light being blocked at the position when pollutants are deposited on the filter papers enough to cause a contaminated state of the filter to reach a preset state; and
a display section, provided on the case, for transmitting the light radiated from the light source to be checked on an external side with a naked eye, wherein the display section comprises a base part made of a transmittable material and a checking part formed with a color which is similar to that of the base part when light is transmitted, but which is contrasted with that of the base part when light is not transmitted.

15. A filter structure in accordance with claim 14, wherein the case of the filter cartridge is provided on one side with a first contact connected with the light source, and a filter body into which the filter cartridge is detachably inserted is provided with a second contact connected with a power source, so that when the filter cartridge is inserted into the filter body, the first contact comes into contact with the second contact to form a circuit connecting the light source to the power source.

16. A filter structure in accordance with claim 15, further comprising a switch for opening/closing the circuit between the power source and the second contact.

17. A filter structure in accordance with claim 16, wherein the switch is turned on/off in a contactable manner by a pivot on a lower end of a lid of a glove box, so that when the lid of the glove box is opened, the switch causes the circuit to be closed to supply power to the light source and wherein the display section is positioned on the inside beyond the glove box.

* * * * *